Patented Aug. 1, 1944

2,354,868

UNITED STATES PATENT OFFICE 2,354,868

RESILIENT PLASTIC COMPOSITION AND METHOD OF MAKING THE SAME

Paul V. McKinney and Milo Glenn Mayberry, Pittsburgh, Pa., assignors to The Pure Oil Company, Chicago, Ill., a corporation of Ohio No Drawing. Application May 11, 1940, Serial No. 334,598

9 Claims. (Cl. 260—18)

This invention relates to plastic compositions and to the method of preparing the same.

It is common practice in the petroleum refining industry to prepare lubricating oil by solvent extraction of crude or semi-refined stocks. For this purpose solvents such as phenol, furfural, nitrobenzene, 2,2-dichloroethyl ether and propane-cresol are in common use. Various stocks are treated including viscous distillates and residues from non-cracking distillation of petroleum oils and residues from the cracking of various oil fractions. In the extraction process a portion of the oil treated is separated as an extract dissolved in the solvent. The extract may amount to 10% to 50% of the total oil treated. This extract contains gum-forming, sludge producing and other unstable constituents undesirable in lubrcating oil.

We have discovered that these extracts, particularly the more viscous ones, after separation of the solvent, form valuable base stocks for the preparation of plastics. By reacting these solvent extracts with sulfur at controlled elevated temperatures and for controlled periods of time, resilient plastic compositions exhibiting unusually low change in penetration value at different temperatures can be prepared. Moreover, the product can be mixed with various fillers and cast or molded under ordinary pressure to obtain articles of high density and weight.

One of the objects of the invention is to produce a novel plastic composition.

Another object of the invention is to provide a method for producing the novel plastic compositions.

Still another object of the invention is to produce a composition suitable for use as a joint filler, as expansion joints, as a binder in mastic compositions, as a composition for the preparation of molded or cast articles and objects and similar products.

A further object of the invention is to provide a method for utilizing petroleum by-products of low value in the manufacture of products of greater economic value.

A still further object of the invention is to produce a novel product which utilizes sulfur.

Another object of the invention is to provide a plastic material which will maintain its stiffness over a wide range of temperature and which will not become brittle when exposed to cold winter weather nor fluid when exposed to hot summer weather.

Other objects and advantages of the invention will become apparent from the following detailed description.

In accordance with the invention, a solvent extract produced in the aforesaid manner and having a Saybolt viscosity at 210° F. greater than 340 seconds, is heated sufficiently high in order to lower its viscosity and to melt sulfur. For this purpose a temperature of approximately 240°–250° F. is satisfactory. Sulfur is gradually added to the heated extract with constant stirring and the mixture may then be gradually heated over a period of approximately one-half to one hour up to reaction temperature. In order to produce a satisfactory product in accordance with the invention, the mixture should be maintained at a reaction temperature of approximately 300°–400° F. for a period of from four to ten hours and the mixture continuously stirred during the entire period. In order to obtain the most satisfactory results the sulfur should be mixed with the extract in the proportion of approximately two parts by weight of sulfur to approximately three parts by weight of extract. However, the quantity of sulfur may vary from 15% to 50% by weight of the finished product. During the reaction of the mixture it may be desirable to add various fillers to impart hardness or toughness to the final product. Inorganic fillers such as silica dust, asbestos and whiting, organic fillers such as carbon and sawdust, and various pigments such as iron oxide, carbon black and yellow ocher may be added. Factices or other solidified natural oils may be added in varying amounts if desired. These materials may be added prior to casting or molding the product at any time during the reaction period, but preferably at or near the end of the reaction period.

During the reaction the sulfur unites with the extract forming a chemical combination therewith. A minor part of the sulfur, usually not more than 10% of that added, may exist in the free state either in suspension and/or in solution in the reaction product. During the reaction hydrogen sulfide is evolved, but the final product is free of any hydrogen sulfide odor.

Catalysts may be added to the mixture to shorten the time of reaction. Suitable catalysts for this purpose are phosphorus and phosphorus pentasulfide, added in proportions of approximately one percent by weight based on the total weight of extract and sulfur. By using a catalyst, a product of lower penetration value can be obtained in a given reaction period.

The following table gives the properties of some extracts which have been used in the preparation of our novel product:

TABLE

|  | Sample | | | | |
| --- | --- | --- | --- | --- | --- |
|  | 1 | 2 | 3 | 4 | 5 |
| S. G. at 60° F | 1.0014 | 1.0158 | 0.9979 | 1.0339 | 1.0212 |
| A. P. I. gravity | 10.3 | 8.1 | 10.3 | 5.6 | 7.1 |
| Flash °F | 520 | 560 | 555 | 540 | 470 |
| Fire °F | 600 | 630 | 640 | 605 | 515 |
| Pour (min.) °F | 65 | 85 | 75 | 100 | 85 |
| Viscosity, Saybolt @ 130° F | 11,095 | | | | |
| Viscosity, Saybolt @ 210° F | 371 | 1,365 | Over 1,500 | Over 1,500 | Over 1,500 |
| Iodine number (Wijs) | 69.4 | 71.5 | 60 | 63.7 | 57.1 |

Extract Sample 1 was prepared by phenol extraction of cylinder stock from Santa Fe Springs crude. Extract Sample 2 was prepared by extraction of cylinder stock from Pennsylvania crude with 2,2-dichloroethyl ether. Extract Sample 3 was prepared by extraction of cylinder stock from Pennsylvania crude with nitrobenzene. Extract Sample 4 was prepared by extracting cylinder stock from Mid-Continent crude with propane-cresol mixture and extract Sample 5 was prepared by extracting cylinder stock from Texas crude with furfural.

The following are specific examples showing how the novel product is made and giving physical characteristics of the various products:

*Example 1.*—A mixture of 80 grams of sulfur and 120 grams of extract Sample 4 was gradually heated from a temperature of 220° F. to 340° F. over a period of one and one-half hours and then was heated at a temperature between 340° and 360° F. for a period of approximately five hours. At the end of this time the product was allowed to cool to room temperature and upon examination had a penetration of 39 millimeters at 25° C. (77° F.)

*Example 2.*—120 grams of extract Sample 4 was heated to a temperature of 275° F. and 80 grams of sulfur added thereto. The mixture was gradually raised during constant stirring to a temperature of 342° F. over a period of one-half hour and was maintained at a temperature between 325° F. and 342° F. for a period of approximately six hours. The final product had an A. S. T. M. penetration of 31 millimeters at 25° C. (77° F.).

*Example 3.*—To 600 grams of extract Sample 4 heated to a temperature of 248° F. was added 400 grams of sulfur and the mixture gradually heated over a period of one-half hour to a temperature just below 320° F. and was then heated at the latter temperature for a period of two and one-half hours and finally heated for a period of three hours at a temperature between 316° F. and 356° F., the mixture being constantly stirred during the entire time. The product had a penetration of 56 millimeters at 25° C. (77° F.).

*Example 4.*—120 grams of extract Sample 4 at a temperature of between 230° F. and 248° F. was mixed with 80 grams of sulfur and 2 grams of phosphorus pentasulfide. The temperature of the mixture was gradually raised over a period of about one-half hour to a temperature of 320° F. and then was held at a temperature of between 320° F. and 371° F. with stirring, for a period of five hours and thirty-five minutes. The resulting product had a penetration of 15 millimeters at 25° C. (77° F.).

*Example 5.*—3635 grams of extract Sample 4 was heated to a temperature of 230°–248° F. and then 2225 grams of sulfur added. After all the sulfur had been added, 60.6 grams of red phosphorus was added and the temperature of the mixture was gradually raised to 312° F. over a period of thirty minutes. Heating with stirring was then continued for six hours and forty-five minutes at a temperature between 312°–361° F. The resulting product had a penetration of 13 millimeters at 25° C. (77° F.).

*Example 6.*—A mixture of 120 grams of extract Sample 4 and 80 grams of sulfur was constantly stirred for four hours at a temperature between 284° F. and 360° F., 40 grams of pulverized coke was added and the heating continued for one hour longer at a temperature of 329°–342° F. The mixture was then permitted to cool and was found to have a penetration of 41.7 millimeters at 25° C. (77° F.).

*Example 7.*—120 grams of extract Sample 1 was mixed with 80 grams of sulfur and heated for nine hours and forty minutes at a temperature of 275°–365° F. with constant stirring. On cooling to room temperature the product was found to be tough and slightly plastic and had a penetration of 15 millimeters at 25° C. (77° F.).

*Example 8.*—120 grams of extract Sample 2 and 80 grams of sulfur were heated for six hours and thirty minutes at a temperature of 277°–345° F. with constant stirring. When cooled to room temperature the product was tough and somewhat plastic.

*Example 9.*—120 grams of extract Sample 3 was mixed with 80 grams of sulfur and the mixture heated from 244° to 342° F. over a period of one hour with constant stirring. Heating was continued for four hours and fifty-five minutes at 327°–351° F. with constant stirring. The resulting product when cooled to room temperature was somewhat softer than that produced in Example 8, but did not flow readily at room temperature.

*Example 10.*—To a mixture of 120 grams of extract Sample 5 was added 80 grams of sulfur. This mixture was heated from 246° F. to 322° F. over a period of one hour and twenty-five minutes with continuous stirring. The mixture was then stirred for four hours longer at a temperature of 315°–343° F. This product on cooling to room temperature was slightly soft, having a penetration of 40 at 22° C. (71.6° F.).

As previously pointed out, the characteristic of our novel product which distinguishes it most noticeably from prior products such as coal tar pitch and asphalt which are used for similar purposes as the present product, is the constant penetration value at varying temperatures. For example, a coal tar pitch having a penetration of 12 millimeters at 0° C. (32° F.) will have a penetration of 50 millimeters at 25° C. (77° F.) and 108 millimeters at 46° C. (114.8° F.). A good grade of asphalt at the same temperatures will have penetration values of 12, 28 and 45 millimeters. A product prepared in accordance with this invention at the same temperatures had penetrations of 1.9, 2.2 and 3.5 millimeters. Another sample prepared in accordance with our invention had penetrations at the same temperatures of approximately 11, 15 and 13.5 millimeters.

As previously pointed out, various fillers may be added to the product to give it toughness and hardness, the amount of filler being dependent on the hardness and toughness desired. As an example, a composition was prepared by mixing 293 grams of sulfurized extract, 110 grams of fish oil factice, 64 grams of Arizona ebony sawdust, 110 grams of whiting and 440 grams of asbestos at a temperature of 250° to 310° F. The resulting product while still hot was molded by compression and was formed by extrusion. The resulting product had a high density and demonstrated its ability to be molded under low temperatures and pressures.

We claim:

1. The method of preparing a plastic composition from extract containing gum-forming, sludge-producing and other unstable constituents undesirable in lubricating oil, which extract is produced by solvent extraction of viscous petroleum oil fractions by means of a selective solvent having a solvent action equivalent to that of phenol in said extraction to produce lubricating oil and which extract after removal of the solvent has a Saybolt viscosity at 210° F. greater than 340 seconds, comprising heating said extract to a temperature at which sulfur melts, mixing sulfur with the heated extract in such amount that the sulfur constitutes from 15 to 50% by weight of the final product, heating and mixing the sulfur and extract at a temperature of 300-400° F. for a period of 4 to 10 hours and cooling the reaction product.

2. Method in accordance with claim 1 in which the selective solvent is furfural.

3. Method in accordance with claim 1 in which the sulfur is mixed with the extract in the ratio of approximately 2 parts of sulfur to 3 parts of extract by weight.

4. Method in accordance with claim 1 in which the sulfur and extract are reacted in the presence of a catalyst selected from the group consisting of phosphorus and phosphorus-sulfides.

5. The method in accordance with claim 1 in which filler is added to the mixture during the reaction period.

6. The method in accordance with claim 1 in which filler and factice are added to the mixture prior to the end of the reaction period.

7. The method of preparing a plastic material which comprises heating extract, obtained from selective extraction of petroleum cylinder stock by means of a solvent having a solvent action equivalent to that of phenol in said extraction and having a Saybolt viscosity at 210° F. above 340 seconds, to a temperature at which sulfur melts, mixing with the heated extract, sulfur in the ratio of approximately 3 parts of extract to 2 parts of sulfur, heating and mixing the sulfur extract at a temperaure between 300 and 400° F. for a period of 4 to 10 hours and cooling the resulting product.

8. Method in accordance with claim 1 in which the selective solvent is propane-cresol.

9. Method in accordance with claim 1 in which the selective solvent is nitrobenzene.

PAUL V. McKINNEY.
M. GLENN MAYBERRY.